United States Patent
Hu

(10) Patent No.: US 11,656,965 B2
(45) Date of Patent: May 23, 2023

(54) EXECUTION SEQUENCE INTEGRITY MONITORING SYSTEM

(71) Applicant: Argo AI, LLC, Pittsburgh, PA (US)

(72) Inventor: Ching Yee Hu, San Jose, CA (US)

(73) Assignee: ARGO AI, LLC, Pittsburgh, PA (US)

(*) Notice: Subject to any disclaimer, the term of this patent is extended or adjusted under 35 U.S.C. 154(b) by 0 days.

(21) Appl. No.: 17/461,179

(22) Filed: Aug. 30, 2021

(65) Prior Publication Data

US 2021/0390025 A1 Dec. 16, 2021

Related U.S. Application Data

(63) Continuation of application No. 16/155,199, filed on Oct. 9, 2018, now Pat. No. 11,138,085.

(51) Int. Cl.
| | |
|---|---|
| *G06F 11/00* | (2006.01) |
| *G06F 11/28* | (2006.01) |
| *G06F 11/07* | (2006.01) |
| *H04L 9/06* | (2006.01) |

(52) U.S. Cl.
CPC .......... *G06F 11/28* (2013.01); *G06F 11/0736* (2013.01); *G06F 11/0751* (2013.01); *G06F 11/0793* (2013.01); *H04L 9/0643* (2013.01)

(58) Field of Classification Search
CPC .. G06F 11/28; G06F 11/0736; G06F 11/0751; G06F 11/0793; H04L 9/0643
USPC ........................................................ 714/1–57
See application file for complete search history.

(56) References Cited

U.S. PATENT DOCUMENTS

| | | | |
|---|---|---|---|
| 7,168,065 B1 | 1/2007 | Naccache et al. | |
| 7,970,946 B1* | 6/2011 | Djabarov | G06F 11/3495 709/224 |
| 8,392,798 B2 | 3/2013 | Flynn et al. | |
| 9,230,122 B2 | 1/2016 | Ghose | |
| 9,336,114 B2 | 5/2016 | Shin et al. | |
| 9,412,280 B1 | 8/2016 | Zwillinger et al. | |
| 9,952,922 B2 | 4/2018 | Edmiston et al. | |
| 2002/0002321 A1 | 1/2002 | Tsukahara et al. | |
| 2002/0023212 A1 | 2/2002 | Proudler | |
| 2004/0030870 A1* | 2/2004 | Buser | G06F 11/3648 712/E9.035 |
| 2007/0130216 A1* | 6/2007 | Wolfgang | G06F 11/1451 |
| 2007/0220261 A1 | 9/2007 | Farrugia et al. | |
| 2010/0031000 A1* | 2/2010 | Flynn | G06F 16/9014 711/216 |

(Continued)

*Primary Examiner* — Sarai E Butler
(74) *Attorney, Agent, or Firm* — Fox Rothschild, LLP

(57) ABSTRACT

A method of verifying execution sequence integrity of an execution flow includes receiving, by a local monitor of an automated device monitoring system from one or more sensors of an automated device, a unique identifier for each function in a subset of an execution flow for which the local monitor is responsible for monitoring. The method includes combining the received unique identifiers to generate a combination value, applying a hashing algorithm to the combination value to generate a temporary hash value, retrieving, from a data store, a true hash value, determining whether the temporary hash value matches the true hash value, and in response to the temporary hash value not matching the true hash value, generating a fault notification. The true hash value represents a result of applying the hashing algorithm to a combination of actual unique identifiers associated with each function in the subset.

20 Claims, 6 Drawing Sheets

(56) References Cited

U.S. PATENT DOCUMENTS

| | | |
|---|---|---|
| 2010/0138703 A1* | 6/2010 | Bansal ............... G06F 11/3495 712/E9.035 |
| 2010/0153785 A1 | 6/2010 | Keromytis et al. |
| 2011/0072274 A1 | 3/2011 | Leoutsarakos et al. |
| 2011/0138188 A1 | 6/2011 | Lee et al. |
| 2011/0218969 A1 | 9/2011 | Anglin et al. |
| 2012/0066761 A1 | 3/2012 | Hillis et al. |
| 2012/0237022 A1 | 9/2012 | Berson et al. |
| 2013/0080843 A1 | 3/2013 | Stergiou et al. |
| 2013/0290729 A1 | 10/2013 | Pettigrew et al. |
| 2014/0096220 A1* | 4/2014 | Da Cruz Pinto ....... G06F 21/00 726/9 |
| 2014/0317479 A1* | 10/2014 | Candelaria ......... G06F 11/0763 714/807 |
| 2015/0095648 A1 | 4/2015 | Nix |
| 2015/0113327 A1 | 4/2015 | Faraj |
| 2015/0193299 A1 | 7/2015 | Hyun et al. |
| 2016/0034332 A1 | 2/2016 | Sato et al. |
| 2016/0132417 A1 | 5/2016 | Grosser et al. |
| 2017/0009386 A1 | 1/2017 | Stephan |
| 2017/0018034 A1 | 1/2017 | Wainman et al. |
| 2017/0032872 A1 | 2/2017 | Lenz et al. |
| 2017/0046304 A1 | 2/2017 | Chen et al. |
| 2017/0068641 A1 | 3/2017 | Albano et al. |
| 2017/0093866 A1 | 3/2017 | Ben-Noon et al. |
| 2017/0180341 A1 | 6/2017 | Walker et al. |
| 2017/0228258 A1* | 8/2017 | Shifman ................. H04L 67/10 |
| 2017/0328729 A1 | 11/2017 | Zhu et al. |
| 2017/0346752 A1 | 11/2017 | Krishnamurthy et al. |
| 2017/0372431 A1* | 12/2017 | Perl ........................ G06Q 40/08 |
| 2018/0024874 A1 | 1/2018 | Al Sharnouby |
| 2018/0165072 A1* | 6/2018 | Fink ........................ G06F 8/311 |
| 2019/0187599 A1 | 6/2019 | Yamaura et al. |
| 2019/0287319 A1 | 9/2019 | Golov |
| 2020/0001971 A1 | 1/2020 | Douglas |
| 2020/0019717 A1 | 1/2020 | Steffey et al. |

\* cited by examiner

EXECUTION SEQUENCE INTEGRITY MONITORING SYSTEM

RELATED APPLICATION AND CLAIM OF PRIORITY

This application is a Continuation of U.S. patent application Ser. No. 16/155,199 filed Oct. 9, 2018, the entirety of which is incorporated herein by reference.

BACKGROUND

This disclosure relates to a monitoring system that verifies the execution sequence of functions of an execution flow, such as one implemented by an automated device. Faults during execution of programming instructions can impact not only the function being performed but also the overall security of the system. Faults can result from innocuous behaviors, such as, for example, making a change in a module that has an unintended impact on a connected module. However, faults may also result from malicious behavior such as, for instance, deliberate tampering, cyber-attacks, or hacking.

While embedding security protocols or security monitors within a software program may help identify faults, such protocols and monitors often impact performance of the software and cause latency issues.

SUMMARY

In an embodiment, a method of verifying execution sequence integrity of an execution flow includes receiving, by a local monitor of an automated device monitoring system from one or more sensors of an automated device, a unique identifier for each function in a subset of an execution flow for which the local monitor is responsible for monitoring. The subset includes fewer than all of the functions in the execution flow, and the execution flow represents a sequence of functions pertaining to an operation of the automated device. The method includes combining the received unique identifiers to generate a combination value, applying a hashing algorithm to the combination value to generate a temporary hash value, retrieving, from a data store, a true hash value, determining whether the temporary hash value matches the true hash value, and in response to the temporary hash value not matching the true hash value, generating a fault notification. The true hash value represents a result of applying the hashing algorithm to a combination of actual unique identifiers associated with each function in the subset.

In various embodiments, combining the received unique identifiers may involve concatenating the received unique identifiers. Concatenating the received unique identifiers may include concatenating the received identifiers in an order corresponding to an order of the functions in the sequence.

Optionally, the data store may be located remotely from the local monitor.

In various embodiments, generating a fault notification comprises halting the operation of the automated device.

Optionally, the method may include sending the temporary hash value to a global monitor of the automated device monitoring system, wherein the global monitor is configured to monitor all of the functions in the execution flow.

In an embodiment, a method of verifying execution sequence integrity of an execution flow includes receiving, by a local monitor of an automated device monitoring system from a sensor of an automated device, a first unique identifier for a first function in a subset of an execution flow for which the local monitor is responsible for monitoring. The subset includes fewer than all of the functions in the execution flow, and the execution flow represents a sequence of functions pertaining to an operation of the automated device. The method includes applying a hashing algorithm to the first unique identifier to generate a first hash value, retrieving, from a data store, a true first hash value, and, in response to the true first hash value matching the first hash value, receiving, by the local monitor, a second unique identifier for a second function in the subset, where the second function immediately follows the first function in the sequence, combining the first hash value and the second unique identifier to generate a combined value, applying the hashing algorithm to the combined value to generate a combined hash value, retrieving, from the data store, a true combined hash value representing a result of applying the hashing algorithm to a combination of the true first hash value and a true second unique identifier for the second function, and in response to the combined hash value not matching the true combined hash value, generating a fault notification. The true first hash value represents a result of applying the hashing algorithm to an actual unique identifier associated with the first function.

In various embodiments, combining the first hash value and the second unique identifier to generate a combined value includes concatenating the first hash value and the second unique identifier. The true combined hash value may represent a result of applying the hashing algorithm to a concatenation of the true first hash value and a true second unique identifier for the second function.

Optionally, the method may include sending the first hash value to a global monitor of the automated device monitoring system, where the global monitor is configured to monitor all of the functions in the execution flow.

In various embodiments, the method may include sending the combined hash value to a global monitor of the automated device monitoring system, where the global monitor is configured to monitor all of the functions in the execution flow.

Optionally, generating a fault notification may include halting the operation of the automated device.

In an embodiment, a method of verifying execution sequence integrity of an execution flow includes receiving, by a local monitor of an automated device monitoring system from one or more sensors of an automated device, a plurality of unique identifiers for a sequence of functions of an execution flow for which the local monitor is responsible for monitoring, where the execution flow represents an operation of the automated device. The method includes applying a hashing algorithm to a first unique identifier that corresponds to a first function in the sequence to generate a first hash value, retrieving, from a data store, a true first hash value, where the true first hash value represents a result of applying the hashing algorithm to an actual unique identifier associated with the first function, and in response to the true first hash value matching the first hash value, for each of the other functions in the sequence, recursively applying the hashing algorithm to a combination of the unique identifier associated with the function and a hash value associated with a function in the sequence that immediately precedes the function to generate a temporary hash value, and generating a fault notification if the temporary hash value does not match a true hash value. The true hash value represents a result of applying hashing algorithm to a true unique identifier associated with the function and a true hash value associated with the function in the sequence that immediately precedes the function. Optionally, generating a fault notification may include halting the operation of the automated device.

In an embodiment, a method of verifying execution sequence integrity of a data path includes receiving, by a monitor of an automated device monitoring system from one or more sensors of an automated device, a plurality of unique identifiers for a sequence of nodes of a data path for which the monitor is responsible for monitoring. The sequence of nodes is configured to process one or more commands for the automated device. The method includes applying a hashing algorithm to a first unique identifier that corresponds to a first node in the sequence to generate a first hash value, retrieving, from a data store, a true first hash value, where the true first hash value represents a result of applying the hashing algorithm to an actual unique identifier associated with the first node, and in response to the true first hash value matching the first hash value, for each of the other nodes in the sequence, recursively applying the hashing algorithm to a combination of the unique identifier associated with the function and a hash value associated with a node in the sequence that immediately precedes the node to generate a temporary hash value, and generating a fault notification if the temporary hash value does not match a true hash value. The true hash value represents a result of applying hashing algorithm to a true unique identifier associated with the node and a true hash value associated with the node in the sequence that immediately precedes the node.

In an embodiment, one or more systems for performing methods described in this disclosure may include a monitor of an automated device monitoring system that is in communication with one or more sensors of an automated device, and a computer-readable storage medium that includes one or more programming instructions that, when executed, causes the monitor to perform one or more actions, such as, for example, one or more verification methods as described in this disclosure.

DETAILED DESCRIPTION

Figure 1:
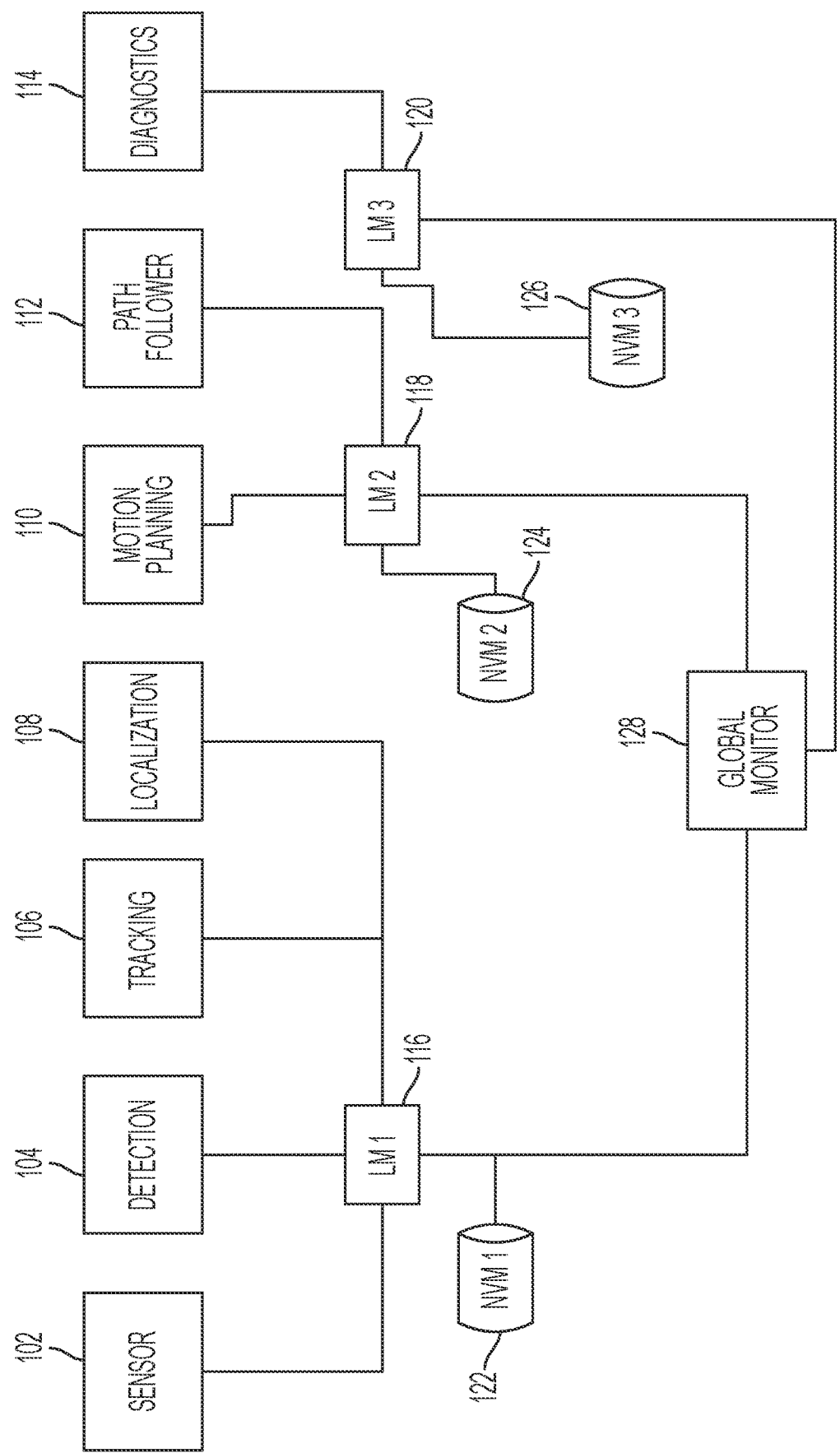
FIG. 1 illustrates an example monitoring system for an automated device.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "automated device" refers to an electronic device that performs at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones, autonomous robotic devices, and/or the like.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, vehicle diagnostic or monitoring systems, other vehicle electronic and/or computing systems, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. The server may be a single device or a collection of devices that are distributed but via which share processing devices and/or memory are shared. In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

An execution flow refers to a sequence of functions that are to be performed in a particular order. A function refers to one or more operational instructions that cause a system to perform one or more actions. In various embodiments, an execution flow may pertain to the operation of an automated device. For example, with respect to an autonomous vehicle, a particular execution flow may be executed by the vehicle in a certain situation such as, for example, when the vehicle is stopped at a red stop light that has just turned green. For instance, this execution flow may include the functions of determining that the light is green, determining whether there are any obstacles in front of or in proximity to the vehicle and, only if the light is green and no obstacles exist, accelerating.

Failing to perform a function in an execution flow, or performing a function out of order in sequence may indicate that a fault has occurred or that another issue exists with respect to the execution flow.

An automated device monitoring system is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an autonomous vehicle, and on-board diagnostics system.

FIG. 1 illustrates an example monitoring system for an automated device system according to an embodiment. As illustrated by FIG. 1, a monitoring system may include one or more subsystems that are responsible for performing one or more types of tasks or functions. For example, FIG. 1 illustrates a monitoring system 100 with a sensor subsystem 102, a detection subsystem 104, a tracking subsystem 106, a localization subsystem 108, a motion planning subsystem 110, a path follower subsystem 112 and a diagnostics subsystem 114.

As illustrated in FIG. 1, the subsystems may be in communication with a local monitor 116, 118, 120. A local monitor 116, 118, 120 may be implemented using hardware, software or a combination of hardware. For instance, a local monitor 116, 118, 120 may be implemented as part of a microcontroller. A local monitor 116, 118, 120 may include one or more of a register or data store for temporarily storing data, a comparator for comparing data, programmed circuitry for performing one or more cryptographic operations and/or the like. A local monitor 116, 118, 120 may receive data pertaining to one or more functions executed by a subsystem, and may use this information to verify at least a portion of the execution flow to which the function(s) pertain as explained in more detail below.

FIG. 1 also illustrates example non-volatile memory (NVM) 122, 124, 126, which may be used to store information, as discussed in more detail throughout this disclosure. In various embodiments, an NVM 122, 124, 126 may include a master hash table. A master hash table refers to a data structure that stores encrypted and/or encoded information associated with one or more functions, as discussed in more detail below.

As shown in FIG. 1, a monitoring system 100 may include a global monitor 128. A global monitor 128 may be implemented using hardware, software or a combination of hardware. For instance, a global monitor 128 may be implemented as part of a microcontroller. A global monitor 128 may include one or more of a register or data store for temporarily storing data, a comparator for comparing data, programmed circuitry for performing one or more cryptographic operations and/or the like. A global monitor 128 may be in communication with one or more of the local monitors 116, 118, 120. As explained in more detail below, local monitors 116, 118, 120 may send to a global monitor 128 information pertaining to functions or tasks executed by one or more of their associated subsystems. The global monitor 128 may use this information to monitor, detect or track patterns at a higher system level. In other words, a local monitor 116, 118, 120 may detect faults or anomalies at a local level, while a global monitor 128 may detect system level faults over a period of time. In various embodiments, a global monitor 128 may be in communication with a diagnostics system (not shown).

It is understood that additional or alternate subsystems, along with additional or fewer local monitors, NVMs and/or configurations of each may be used within the scope of this disclosure.

Figure 2:
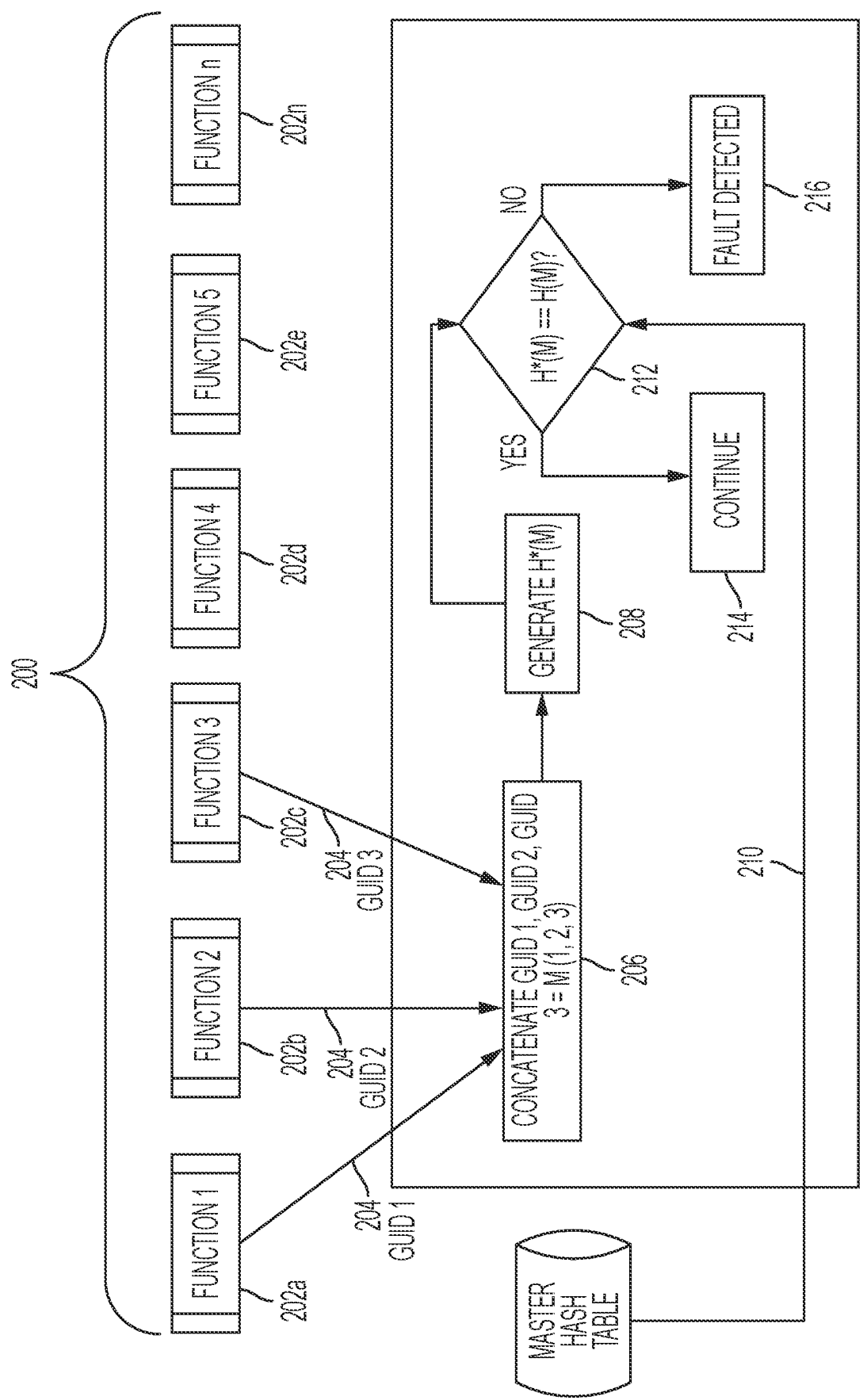
FIG. 2 illustrates an example method of verifying execution sequence integrity of an execution flow.

FIG. 2 illustrates an example method of verifying execution sequence integrity of an execution flow according to an embodiment. As illustrated by FIG. 2, an execution sequence 200 may include a sequence of functions—{Function 1, Function 2, . . . , Function n} 202a-202n. In various embodiments, each function may be associated with a unique identifier such as, for example, a globally unique identifier (GUID), a universally unique identifier (UUID), and/or the like. A unique identifier for a function may be assigned to a function during design of an execution flow.

As illustrated by FIG. 2, local monitor may receive 204 a unique identifier from one or more functions (Function 1 202a, Function 2 202b and Function 3 202c) in an execution flow at run time. For instance, a function may send its unique identifier to a local monitor that is responsible for monitoring the function at runtime of the function.

In various embodiments, a local monitor may receive 204 unique identifiers from only a subset of functions in an execution flow. For instance, two or more local monitors may share responsibility for monitoring execution of an entire execution flow—one local monitor may be responsible for monitoring a certain subset of functions in the execution flow, while one or more other local monitors may be responsible for monitoring one or more other subsets of functions in the execution flow. Dividing responsibility for monitoring functions in an execution flow between two or more local monitors may improve efficiency of the monitoring process and therefore reduce latency. In other embodiments, a single local monitor may monitor all of the functions in an execution flow. As illustrated in FIG. 2, the local monitor receives GUID 1 from Function 1, GUID 2 from Function 2 and GUID from Function 3.

A local monitor may combine 206 the received unique identifiers to generate a combination value. The combination value may be a string of the combined received unique identifiers. For example, the local monitor may concatenate the received unique identifiers into a single string represented in FIG. 2 as M(1, 2, 3). In various embodiments, the unique identifiers may be combined in an order corresponding to the order of their corresponding functions in the execution flow sequence. For example, referring to FIG. 2, the unique identifiers may be concatenated as GUID 1+GUID 2+GUID 3 as this corresponds to the order of their corresponding functions 202a, 202b, 202c in the execution flow 202.

A local monitor may apply 208 a cryptographic operation on the combination value to generate a temporary hash value. A cryptographic operation may include a hashing algorithm, an encoding algorithm, an encryption algorithm and/or the like. For instance, an SHA-256 cryptographic hash algorithm may be used. As illustrated in FIG. 2, the temporary hash value of the concatenation value (M(1, 2, 3)) is represented as H*(M). In various embodiments, a local monitor may send the temporary hash value to a global monitor for further analysis and/or processing.

A local monitor may retrieve 210 a true hash value for the combination value. A true hash value may represent a resulting of applying the cryptographic operation to a combination of the actual unique identifiers associated with each function for which unique identifiers are received. For instance, with respect to FIG. 2, a true hash value for the concatenation of GUID 1, GUID 2 and GUID 3 may be the result of applying the cryptographic operation to the actual unique identifiers associated with Function 1, Function 2 and Function 3.

In various embodiments, a local monitor may retrieve 210 a true hash value from a master hash table of a data store. For instance, a master hash table may be stored in an NVM that is located remotely from the local monitor. Alternatively, a master hash table may be stored in an NVM of the local monitor. The master hash table may only be read by one or more local monitors, and the contents of the master hash table may be protected for integrity, authenticity, confidentiality, availability, authorization and/or tamper detection.

The local monitor may determine 212 whether the temporary hash value matches the true hash value. If it does, then the function sequence has been preserved and has not been altered. In this case, the local monitor may proceed 214 to examine a next set of functions. If the local monitor determines 212 that the temporary hash value does not match the true hash value, the local monitor may generate 216 a fault notification.

In an embodiment, a fault notification may be an alert, an email or other notification alerting a system user, such as an administrator, that a fault was detected with the execution flow. For example, a local monitor may cause an alert in the form of a graphical user interface element to be displayed to a user via a display device. In another embodiment, generating 216 a fault notification may include causing a system to perform an action or refrain from performing one or more actions. For instance, generating 216 a fault notification may involve halting the operation of an automated device.

Figure 3:
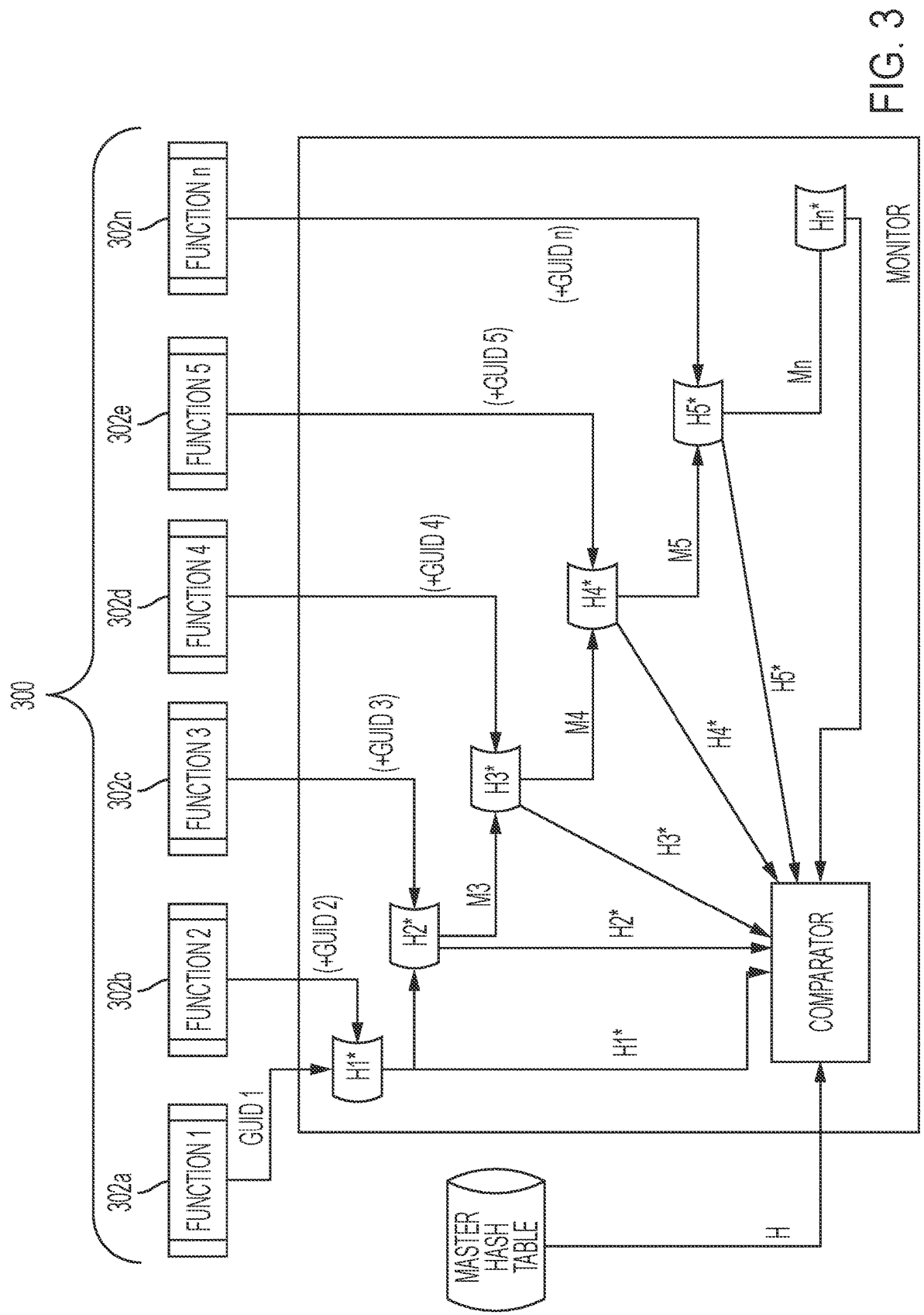
FIG. 3 illustrates an example method of verifying execution sequence integrity of an execution flow.

FIG. 3 illustrates another method of verifying execution sequence integrity of an execution flow according to an embodiment. As illustrated by FIG. 3, an execution sequence 300 may include a sequence of functions—{Function 1, Function 2, . . . , Function n} 302a-302n. In various embodiments, each function may be associated with a unique identifier such as, for example, a globally unique identifier (GUID), a universally unique identifier (UUID), and/or the like. A unique identifier for a function may be assigned to a function during design of a workflow.

As illustrated in FIG. 3, a monitor may receive 304 a unique identifier from the first function in an execution flow. The monitor may be a local monitor or it may be a global monitor. A variable representing the current function may be set to indicate Function 1. The monitor may apply 306 a cryptographic operation on the unique identifier to generate an encoded value. For example, a monitor may apply a hashing algorithm to a unique identifier to generate a hash value.

A monitor may retrieve 308 a true encoded value associated with the first function. A true encoded value may represent a result of applying the cryptographic operation to an actual unique identifier associated with the first function. In various embodiments, a monitor may retrieve 308 a true encoded value for the first function (or one or more other functions) from a data store, such as, for example, a master hash table.

The monitor may compare the generated encoded value for the first function to the retrieved true encoded value for the first function. If the values do not match, then the monitor may generate a fault notification. If the values do match, the monitor may update the current function variable to indicate the next function in the execution flow. The monitor may receive a unique identifier associated with the now current function in the execution flow. For example, referring to FIG. 3, a monitor may receive a unique identifier (GUID 2) associated with Function 2.

The monitor may combine the received unique identifier associated with the now current function in the execution flow with the generated encoded value associated with the function that preceded the now current function. For example, referring to FIG. 3, the monitor may combine H1* with GUID 2 to generate a combined value M2. In various embodiments, a monitor may combine values by concatenating them. A monitor may apply a cryptographic operation to the combined value to generate an encoded combined value. The monitor may retrieve from a data store a true encoded combined value representing the result of applying the cryptographic operation to a combination of the encoded value associated with the function that preceded the now current function and the unique identifier associated with the current function. If the values do not match, then the monitor may generate a fault notification. If the values do match, the monitor may update the current function variable to indicate the next function in the execution flow, and continue this process for one or more remaining functions in the execution flow.

In other words, a monitor may, for one or more remaining functions in an execution flow, recursively apply a cryptographic operation to the unique identifier associated with a current function and an encoded value associated with the function that immediately precedes the current function in the execution flow to generate an encoded value for the current function. The monitor may compare the computed values to true values retrieved from a data store to confirm that they match. If they do, the monitor may continue its process until all of the functions in the execution flow have been examined. If they do not, the monitor may generate a fault notification.

Although FIG. 2 and FIG. 3 depict methods of verifying execution sequence integrity of an execution flow, it is understood that these methods may be applied to verify the performance of various other sequences such as, for example, data paths, authorized channels and/or the like. For instance, in certain systems, only authorized sources may be permitted to send commands through a channel or data path to be executed. A channel or data path may include one or more nodes, where each node is a program, a function, a hardware component, a data structure and/or the like. In an automated device system, a data path may include a sequence of various automated device sensors according to various embodiments.

Figure 4:
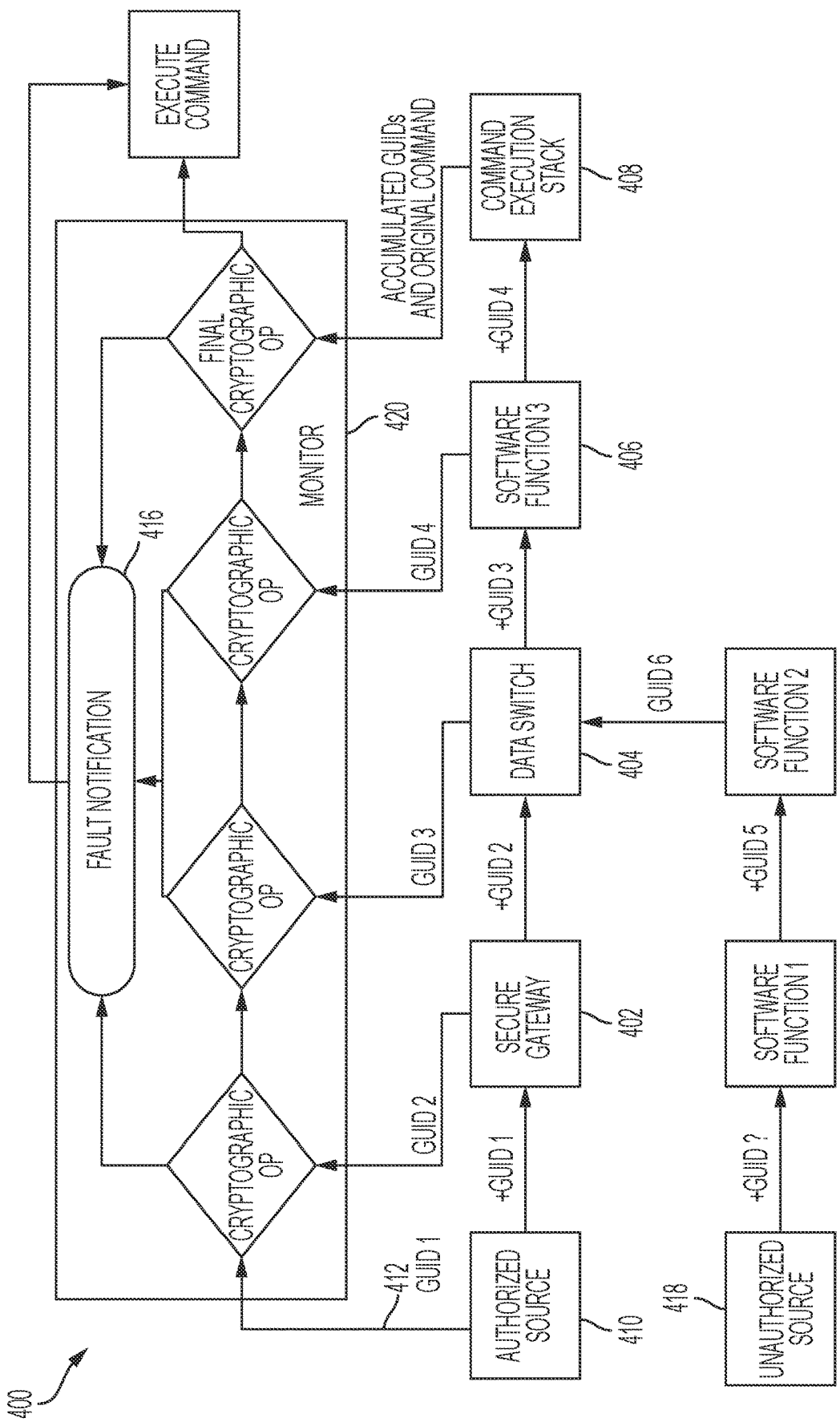
FIG. 4 illustrates an example method of verifying execution sequence integrity of a data path.

FIG. 4 illustrates an example data path 400. As illustrated in FIG. 4, the data path 400 includes nodes such as a secure gateway 402, a data switch 404, a software function 406, and an authorized source 410. Additional and/or alternate nodes may be used within the scope of this disclosure. The data path may include a command execution stack 408. Only an authorized source 410 is permitted to send commands through the data path for inclusion in the execution stack 408. In the context of automated devices, an example command may be "change system into service mode from autonomous mode." One or more of the nodes 402, 404, 406, 410 may append a unique identifier that uniquely identifies the node to the command as it passes through the data path. As illustrated by FIG. 4, the system may verify the integrity of the data path for one or more nodes in the path in a manner similar to that explained above with respect to FIG. 3.

For example, as illustrated by FIG. 4, a monitor 420 (local monitor or global monitor) may receive 412 a unique identifier from the authorized source 410. A variable representing the current nodes in a data path may be set to indicate the authorized source 410. The monitor may apply 414 a cryptographic operation to the unique identifier to generate an encoded value. For example, a monitor may apply a hashing algorithm to a unique identifier to generate a hash value.

A monitor may retrieve a true encoded value associated with the authorized source. A true encoded value may represent a result of applying the cryptographic operation to an actual unique identifier associated with the authorized source. In various embodiments, a monitor may retrieve a true encoded value for the authorized source (or one or more nodes) from a data store, such as, for example, a master hash table.

The monitor may compare the generated encoded value for the authorized source to the retrieved true encoded value for the first function. If the values do not match, then the monitor may generate 416 a fault notification. If the values do match, the monitor may update the current variable to indicate the next node in the data path. The monitor may receive a unique identifier associated with the now current node in the data path. For example, referring to FIG. 4, a monitor may receive a unique identifier (GUID 2) associated with a secure gateway 402.

The monitor may combine the received unique identifier associated with the now current node in the data path with the generated encoded value associated with the node that preceded the now current node. In various embodiments, a monitor may combine values by concatenating them. A monitor may apply a cryptographic operation to the combined value to generate an encoded combined value. The monitor may retrieve from a data store a true encoded combined value representing the result of applying the cryptographic operation to a combination of the encoded value associated with the node that preceded the now current node and the unique identifier associated with the current node. If the values do not match, then the monitor may generate a fault notification. If the values do match, the monitor may update the current node variable to indicate the next node in the data path, and continue this process for one or more remaining nodes in the data path.

As illustrated in FIG. 4, an unauthorized source 418 that attempts to propagate an unauthorized command through a data path will have the incorrect cryptographic operation collected along the data path and, as such, will not be able to execute the unauthorized command.

In various embodiments, a monitor may perform a method of verifying execution sequence integrity of an execution flow by using various parameter values. For example, one or more sensors of a system that is being monitored, such as, for example, an automated device, may measure or otherwise obtain one or more parameter values that pertain to an operational state of the system. Examples of sensors of an automated device system may include, without limitation, an image sensor, a radar sensor, a lidar sensor, an audio sensor, an optics sensor, an inertial measurement unit (IMU), a gyroscope, an accelerometer, a geolocation sensor, and/or the like.

With respect to an autonomous vehicle, a scenario may be as follows: An autonomous vehicle is stopped at an intersection, and the traffic light has just turned from Red to Green. However, there are still a few pedestrians in the crosswalk, which is part of the autonomous vehicle's planned corridor. The correct action for the autonomous vehicle to take in this situation is to wait for the pedestrians to clear the corridor and then increase its velocity. The wrong action for the autonomous vehicle to take is to increase its velocity before the pedestrians clear the corridor. Table 1 illustrates example parameters that may be obtained from one or more autonomous vehicle sensors, and that are associated with this operational state of the system.

TABLE 1

| Parameter | Parameter value |
| --- | --- |
| Traffic light state | GREEN |
| Current AV velocity | 0 |
| Pending motion planning action | Velocity = 25 mph |
| Is corridor cleared? | NO |
| AV motion control action | Velocity = 0 |

Figure 5:
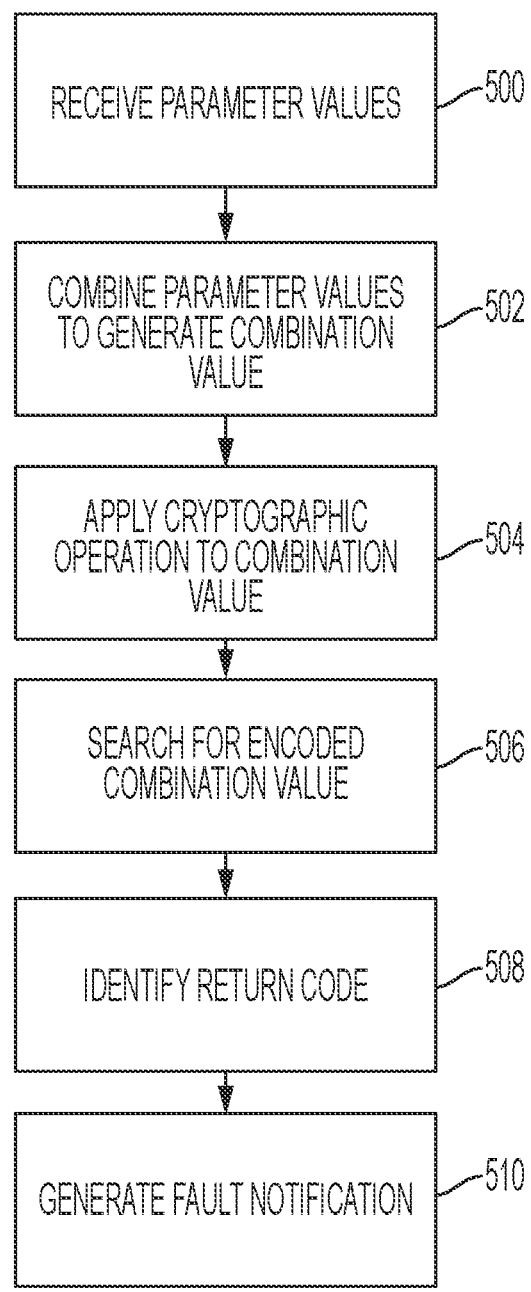
FIG. 5 illustrates an example method of verifying execution sequence integrity of an execution flow by using various parameter values.

FIG. 5 illustrates an example method of verifying execution sequence integrity of an execution flow by using various parameter values according to an embodiment. As illustrated by FIG. 5, a monitor, such as a local monitor or a global monitor, may receive 500 one or more parameter values from one or more sensors of a system. The parameter values may correspond to parameters associated with a particular operational state of the system.

The monitor may combine 502 the received parameter values to generate a combination value. For example, the monitor may concatenate the received parameter values to generate a concatenation value. The monitor may combine the parameter values in specific sequence. For example, the parameter values illustrated in Table 1 may be combined into a string represented by the following:
Traffic light state: GREEN+Current AV velocity: 0+Pending MP action: velocity=25 mph+Is corridor cleared: NO+AV MC action: velocity=0.

In an embodiment, a monitor may apply 504 a cryptographic operation to the combination value to generate an encoded combination value. For example, a monitor may apply a SHA-256 cryptographic hash algorithm to a combination value. For instance, applying a SHA-256 cryptographic hash algorithm to the combination value identified above may result in the following encoded combination value:
8992289100b954b6e500416b5402039f8f22b0c5d6d4b-421e6516677672362cb.

In various embodiments, a monitor may search 506 a data store for the encoded combination value and identify 508 a return code associated with the encoded combination value. The data store may store various encoded combination values and associated return codes. A return code may indicate whether the associated encoded combination value is correct or incorrect. If a return code indicates an encoded combination value is incorrect, it may also indicate a priority level. Table 2 illustrates an example data store according to various embodiments.

TABLE 2

| Encoded combination value | Return code |
| --- | --- |
| 8992289100b954b6e500416b5402039f8f22b0c5d6d4b421e6516677672362cb | PASS_CONTINUE |
| 786cde301484293b196ad0174eff68da6fcfe6f7cf283c21a90549835100d416 | FAIL_HIGH_PRIORITY_CHECK_STATE |

In an embodiment, if a monitor identifies a return code indicating that an encoded combination value is incorrect, the monitor may generate 510 a fault notification. As discussed above, a fault notification may be an alert, an email or other notification alerting a system user, such as an administrator, that a fault was detected with the execution flow. For example, a local monitor may cause an alert in the form of a graphical user interface element to be displayed to a user via a display device. In another embodiment, generating 510 a fault notification may include causing a system to perform an action or refrain from performing one or more actions. For instance, generating 510 a fault notification may involve halting the operation of an automated device.

If a monitor cannot locate an encoded combination value in a searched data store, the monitor may create a new entry in the data store, add the encoded combination value to the new entry, and prompt a user to provide an associated return code which may be stored in association with the encoded combination value in the data store. As such, the system can scale to address different combinations of parameter values as they are encountered.

In various embodiments, with respect to any of the ways of verifying execution sequence integrity of an execution flow, a local monitor may send or forward information to a global monitor. A global monitor may be associated with one or more local monitors, subsystems or systems, and may be responsible for monitoring and detecting system level faults over a period of time. A global monitor may be in communication with a diagnostics system.

Figure 6:
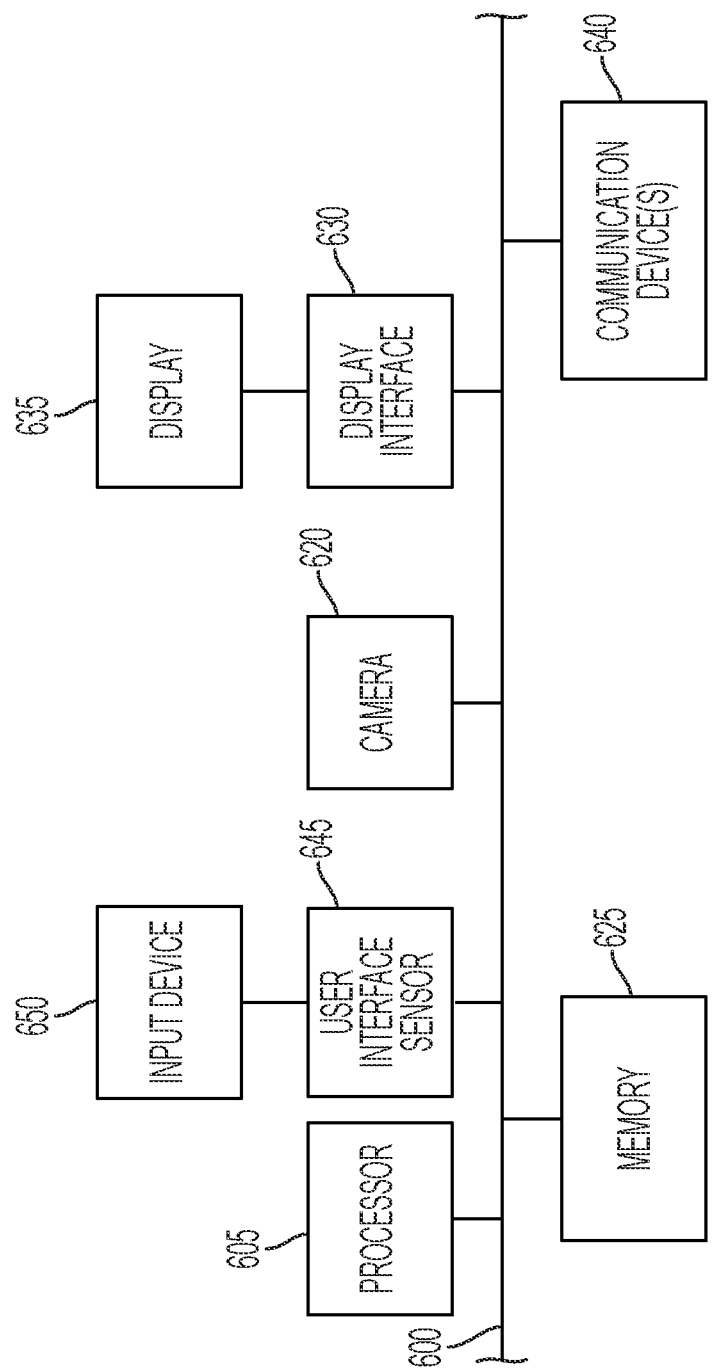
FIG. 6 is a block diagram of elements of a computing device on which the various systems and methods in this document could be implemented.

FIG. 6 depicts an example of internal hardware that may be included in any of the electronic components of the system, such as the user's smartphone or a local or remote computing device in the system. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a wireless antenna, an RFID tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard, a mouse, a joystick, a touchscreen, a touch pad, a remote control, a pointing device and/or microphone. Digital image frames also may be received from a camera 620 that can capture video and/or still images.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A method, comprising:
   receiving, by a processor, a first unique identifier from a first function of a plurality of functions in an execution flow that are to be sequentially performed by an automated device, the first unique identifier identifying the first function and each of the functions comprising at least one operational instruction that causes the automated device to perform at least one action;
   applying, by the processor, an algorithm to the first unique identifier to obtain a first code value;
   searching a data store for a first reference code value associated with the first code value, the first reference code value representing a result of applying the algorithm to an actual unique identifier associated with the first function; and
   in response to the first reference code value matching the first code value, performing the following operations by the processor:
      receiving a second unique identifier from a second function of the plurality of functions that immediately follows the first function in the execution flow, the second unique identifier identifying the second function;
      combining the first code value and the second unique identifier to generate a combined value;
      applying the algorithm to the combined value to obtain a second code value;
      retrieving, from the data store, a second reference code value representing a result of applying the algorithm to a combination of the first code value and an actual unique identifier associated with the second function; and
      generating a fault notification in response to the second reference code value indicating that the second code value is incorrect.

2. The method according to claim 1, wherein the second code value is obtained by concatenating the first code value and the second unique identifier in accordance with a sequence defined by the execution flow.

3. The method according to claim 1, wherein the processor is configured to monitor all functions of the plurality of functions that are to be performed by the automated device.

4. The method according to claim 1, wherein the processor is configured to monitor different subsets of said functions separately from each other.

5. The method according to claim 1, wherein the fault notification comprises halting the at least one operational instruction of the automated device.

6. The method according to claim 1, wherein the plurality of functions are to be performed by one or more sensors of the automated device, the one or more sensors comprising at least one of an image sensor, a lidar sensor, a radar sensor, an audio sensor, an optics sensor, an inertial measurement unit, a gyroscope, an accelerometer, and a geolocation sensor.

7. The method according to claim 1, wherein the automated device comprises an autonomous vehicle and the processor comprises an on-board diagnostic system.

8. A non-transitory computer-readable medium that stores instructions that is configured to, when executed by at least one computing device, cause the at least one computing device to perform operations comprising:
receive a first unique identifier from a first function of a plurality of functions in an execution flow that are to be sequentially performed by an automated device, the first unique identifier identifying the first function and each of the functions comprising at least one operational instruction that causes the automated device to perform at least one action;
apply an algorithm to the first unique identifier to obtain a first code value;
searching a data store for a first reference code value associated with the first code value, the first reference code value representing a result of applying the algorithm to an actual unique identifier associated with the first function; and
in response to the first reference code value matching the first code value:
receive a second unique identifier from a second function of the plurality of functions that immediately follows the first function in the execution flow, the second unique identifier identifying the second function;
combine the first code value and the second unique identifier to generate a combined value;
apply the algorithm to the combined value to obtain a second code value;
retrieve, from the data store, a second reference code value representing a result of applying the algorithm to a combination of the first code value and an actual unique identifier associated with the second function; and
generate a fault notification in response to the second reference code value indicating that the second code value is incorrect.

9. The non-transitory computer-readable medium according to claim 8, wherein the second code value is obtained by concatenating the first code value and the second unique identifier in accordance with a sequence defined by the execution flow.

10. The non-transitory computer-readable medium according to claim 8, wherein a processor is configured to monitor all functions of the plurality of functions that are to be performed by the automated device.

11. The non-transitory computer-readable medium according to claim 8, wherein a processor is configured to monitor different subsets of said functions separately from each other.

12. The non-transitory computer-readable medium according to claim 8, wherein the fault notification comprises halting the at least one operational instruction of the automated device.

13. The non-transitory computer-readable medium according to claim 8, wherein the plurality of functions are to be performed by one or more sensors of the automated device, the one or more sensors comprising at least one of an image sensor, a lidar sensor, a radar sensor, an audio sensor, an optics sensor, an inertial measurement unit, a gyroscope, an accelerometer, and a geolocation sensor.

14. The non-transitory computer-readable medium according to claim 8, wherein the automated device comprises an autonomous vehicle and the processor comprises an on-board diagnostic system.

15. A system, comprising:
a processor;
a non-transitory computer-readable storage medium comprising programming instructions that are configured to cause the processor to implement a method for verifying execution sequence integrity of an execution flow, wherein the programming instructions comprise instructions to:
receive a first unique identifier from a first function of a plurality of functions in an execution flow that are to be sequentially performed by an automated device, the first unique identifier identifying the first function and each of the functions comprising at least one operational instruction that causes the automated device to perform at least one action;
apply an algorithm to the first unique identifier to obtain a first code value;
search a data store for a first reference code value associated with the first code value, the first reference code value representing a result of applying the algorithm to an actual unique identifier associated with the first function; and
in response to the first reference code value matching the first code value:
receive a second unique identifier from a second function of the plurality of functions that immediately follows the first function in the execution flow, the second unique identifier identifying the second function;
combine the first code value and the second unique identifier to generate a combined value;
apply the algorithm to the combined value to obtain a second code value;
retrieve, from the data store, a second reference code value representing a result of applying the algorithm to a combination of the first code value and an actual unique identifier associated with the second function; and
generate a fault notification in response to the second reference code value indicating that the second code value is incorrect.

16. The system according to claim 15, wherein the second code value is obtained by concatenating the first code value and the second unique identifier in accordance with a sequence defined by the execution flow.

17. The system according to claim 15, wherein the processor is configured to monitor all functions of the plurality of functions that are to be performed by the automated device.

18. The system according to claim 15, wherein the processor is configured to monitor different subsets of said functions separately from each other.

19. The system according to claim 15, wherein the fault notification comprises halting the at least one operational instruction of the automated device.

20. The system according to claim 15, wherein the plurality of functions are to be performed by one or more sensors of the automated device, the one or more sensors comprising at least one of an image sensor, a lidar sensor, a radar sensor, an audio sensor, an optics sensor, an inertial measurement unit, a gyroscope, an accelerometer, and a geolocation sensor.

* * * * *